US006717454B2

(12) United States Patent
Chiou et al.

(10) Patent No.: US 6,717,454 B2
(45) Date of Patent: Apr. 6, 2004

(54) SWITCHING MODE N-ORDER CIRCUIT

(75) Inventors: Ming-Hsiang Chiou, Hsinchu (TW); Chen-Yu Hsiao, Pingtung (TW)

(73) Assignee: Frontend Analog and Digital Technology Corporation, Taipei (TW)

( * ) Notice: Subject to any disclaimer, the term of this patent is extended or adjusted under 35 U.S.C. 154(b) by 0 days.

(21) Appl. No.: 10/414,094

(22) Filed: Apr. 16, 2003

(65) Prior Publication Data

US 2004/0000943 A1 Jan. 1, 2004

(30) Foreign Application Priority Data

Jun. 26, 2002 (TW) ..................................... 091114117 A

(51) Int. Cl.[7] ............................ G06G 7/24; G06F 7/556

(52) U.S. Cl. ........................ 327/349; 327/356; 327/359

(58) Field of Search ................................ 327/346, 349, 327/356, 359, 306

(56) References Cited

U.S. PATENT DOCUMENTS 4,835,421 A * 5/1989 Khoury et al. .............. 327/349
5,107,150 A * 4/1992 Kimura ...................... 327/349

* cited by examiner

*Primary Examiner*—Tuan T. Lam
(74) *Attorney, Agent, or Firm*—Rosenberg, Klein & Lee

(57) ABSTRACT

A switching mode N-order circuit comprises a first unit, a second unit and a comparator. The first unit includes an operational amplifier integral circuit to integrate a first voltage. The second unit has one or more stages of subunits in cascade each including an operational amplifier integral circuit to integrate a second voltage stage by stage. Each of the operational amplifier integral circuits is equipped with a switch to be controlled by the comparator to be discharged. The output of the N-order circuit is derived from the output of the second unit.

14 Claims, 2 Drawing Sheets

SWITCHING MODE N-ORDER CIRCUIT

FIELD OF THE INVENTION

The present invention relates generally to a square circuit or higher order circuit, and more particularly to a switching mode N-order circuit applicable to integrated circuit.

BACKGROUND OF THE INVENTION

A square circuit or higher order circuit is one to square or N-order operate the level of a DC or AC signal. To obtain a voltage level of an output signal to be the square or N-order of an input voltage, several square circuits or N-order circuits are proposed. In many digital logic circuits and consumer electronic products, the function of square or N-order operation in mathematical operations is commonly used. However, the production cost is the most important consideration for such products. In addition to simplified circuit, smaller chip area, lower power consumption and cheaper process are all the target design. Further, the circuit can be easily combined with other digital circuit or system, if CMOS process is used to produce the square circuit or N-order circuit. Therefore, it is desired a square circuit or higher order circuit implemented with low power and DC/AC switching mode circuit.

SUMMARY OF THE INVENTION

One object of the present invention is to provide a square/N-order circuit.

Another object of the present invention is to provide a low power square/N-order circuit.

Still another object of the present invention is to provide a switching mode square/N-order circuit.

Yet another object of the present invention is to provide a square/N-order circuit available for AC/DC operations.

The invented circuit is based on a DC/AC square circuit and extended to higher order according to the principles of the square circuit. In a square circuit, according to the present invention, there are included two operational amplifier integral circuits and a comparator. These two operational amplifier integral circuits integrate a first and a second voltages, respectively, and each of them is equipped with a switch to control the operational amplifier integral circuit to be discharged. The comparator compares the output of one of the operational amplifier integral circuits with the second voltage to produce the control signal to control the switch, and the magnitude of the output voltage of another operational amplifier integral circuit is the square of the magnitude of the second voltage. In a higher order circuit, according to the present invention, in addition to an operational amplifier integral circuit to integrate a first voltage and its output compared with a second voltage by a comparator to produce the control signal, there in further included two or more stages of operational amplifier integral circuits in cascade to integrate the second voltage stage by stage to produce an output voltage whose magnitude is N-order of that of the second voltage, where N is the stage number of the cascaded operational amplifier integral circuits added by 1. Likewise, each of the cascaded operational amplifier integral circuits is equipped with a switch controlled by the output of the comparator to be discharged.

BRIEF DESCRIPTION OF THE DRAWINGS

The above and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

The invented circuit is based on a DC/AC square circuit, and according to the principles of the square circuit a higher order circuit is developed. Therefore, a switching mode square circuit and the operational principles thereof according to the present invention is first are described and explained, and then a higher order circuit and the operations thereof is described and explained in reference to the principles of the square circuit.

Figure 1:
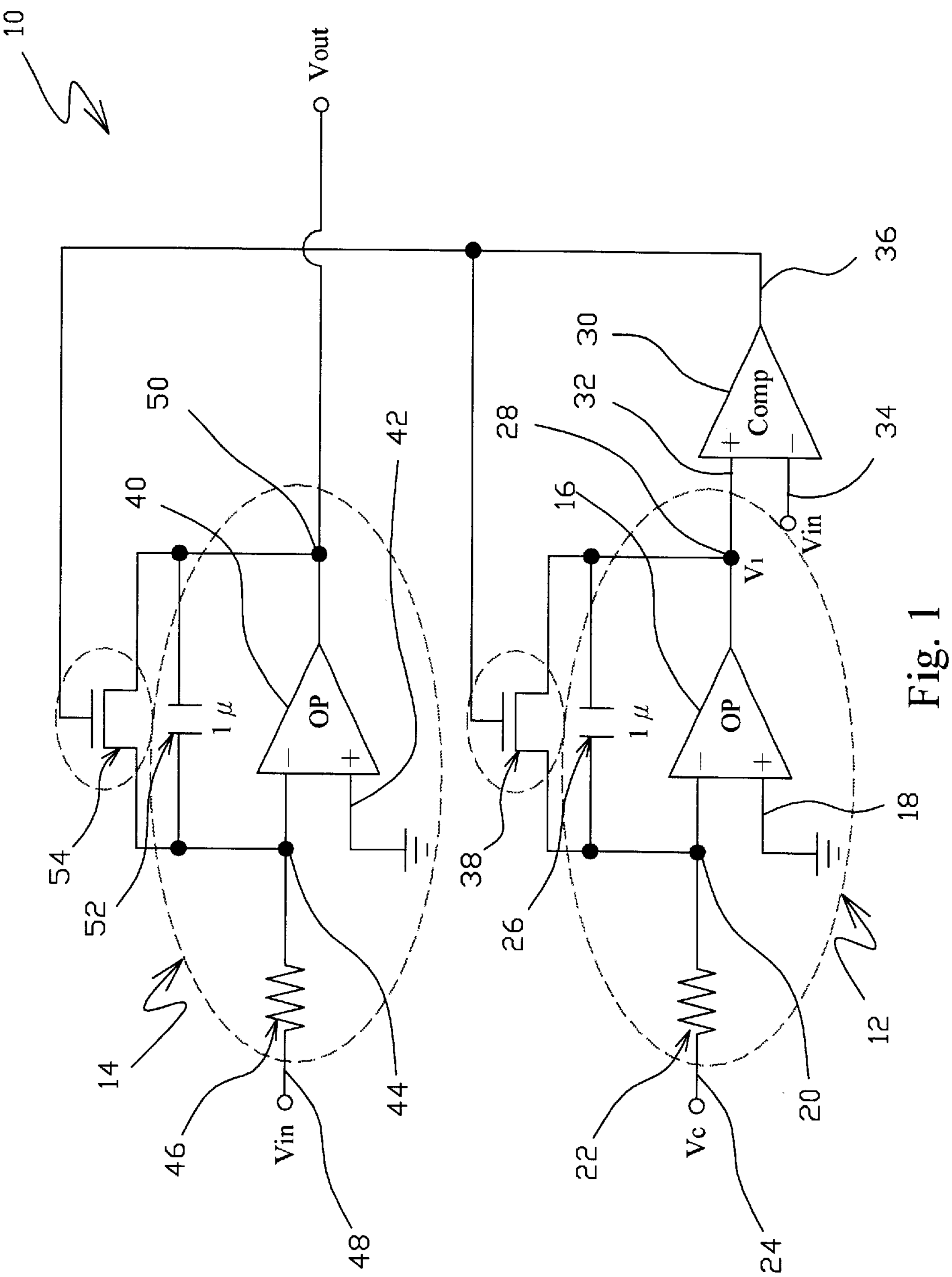
FIG. 1 is an embodiment square circuit of the present invention.

FIG. 1 shows an embodiment square circuit of the present invention, in which a square circuit 10 available for DC/AC operations comprises two units, i.e., operational amplifier integral circuits 12 and 14. The operational amplifier integral circuit 12 includes an operational amplifier 16 whose non-negative input 18 is connected to ground and whose negative input 20 is connected with a resistor 22, and the other terminal 24 of the resistor 22 serves as the input of operational amplifier integral circuit 12 and is connected with a voltage Vc. In this embodiment, the voltage Vc is −1 volt. A capacitor 26 is connected between the negative input 20 and output 28 of the operational amplifier 16, and the output 28 is connected to the non-negative input 32 of a comparator 30. The non-negative input 34 of the comparator 30 is connected with a voltage Vin, and the output 36 of the comparator 30 provides a control signal to control a MOS transistor 38 that is connected to the capacitor 26 in parallel and is controlled to switch to discharge the capacitor 26. Another operational amplifier integral circuit 14 also includes an operational amplifier 40 whose non-negative input 42 is connected to ground and whose negative input 44 is connected with a resistor 46, and the other terminal 48 of the resistor 46 serves as the input of the operational amplifier integral circuit 14 and is connected with the voltage Vin. Another capacitor 52 is connected between the negative input 44 and output 50 of the operational amplifier 40, and the output 50 is the output Vout of the square circuit 10. Likewise, the capacitor 52 is connected with a MOS transistor 54 in parallel, and the MOS transistor 54 is controlled by the control signal from the output of the comparator 36 to discharge the capacitor 52.

The operations of the square circuit 10 are described herewith. At the initial state of the square circuit 10, the output voltages of the operational amplifier integral circuits 12 and 14 are almost 0 volt, since them are not charged yet. This zero or low voltage makes the voltage on the output 36 of the comparator 30 at 0, and, as a result, the MOS transistors 38 and 54 are both turned off and the capacitors 26 and 52 are available to be charged. When a DC or AC voltage Vin is inputted through the operational amplifier integral circuit 14, with the negative feedback function of the operational amplifier 40, the square circuit 10 has an output voltage:

$$V_{out} = -\frac{1}{RC}\int_0^t V_{in}dt = -\frac{1}{RC}V_{in}t, \quad \text{[EQ-1]}$$

where R is resistance of the resistor 46, and C is capacitance of the capacitor 52. Similarly, with the charging of the operational amplifier integral circuit 12 by the voltage Vc, the operational amplifier integral circuit 12 has an output voltage:

$$V_1 = -\frac{1}{RC}\int_0^t V_c dt = -\frac{1}{RC}\int_0^t (-1)dt = \frac{t}{RC}, \quad \text{[EQ-2]}$$

where R is resistance of the resistor 22, and C is capacitance of the capacitor 26. When the operational amplifier integral circuit 14 is continuously charged by the voltage Vin, another operational amplifier integral circuit 12 is also charged by the voltage Vc until the voltage V1 on the output 28 of the operational amplifier integral circuit 12 is larger than the voltage Vin. At this time, the output 36 of the comparator 30 is immediately raised to a high level and makes the MOS transistors 38 and 54 turned on, resulting in discharging of the operational amplifier integral circuits 12 and 14. From the operational amplifier integral circuit 14 is charged by the voltage Vin till the voltage V1 on the output 28 of the operational amplifier integral circuit 12 reaches the voltage Vin, according to EQ-2, the time duration:

$$t1 = RC \times V1 = RC \times Vin. \quad \text{[EQ-3]}$$

For simplification, the resistors 22 and 46 and the capacitors 26 and 52 of the operational amplifier integral circuits 12 and 14 are assumed to be equal. By substituting EQ-3 to EQ-1, the square circuit 10 has an output:

$$Vout = (-Vin \times t1/RC) \times (RC \times Vin) = -(Vin)^2. \quad \text{[EQ-4]}$$

This manner the output voltage Vout of the square circuit 10 has a magnitude of the square of the input voltage Vin and a phase difference of 180 degrees therebetween. Moreover, the operation of the square circuit 10 has a time delay for its output to reach to a steady state due to the utilization of RC charging, and this time delay is related to the magnitude of the squared voltage at last and the RC time constant, which is about several times of the RC time constant.

Further, if the input voltage Vin is a low frequency AC signal, the speed of the square circuit 10 should be fast enough for operations over the frequency of the input voltage Vin. If the input voltage Vin is a high frequency AC signal, the front-end of the square circuit 10 should be inserted with a sample/hold circuit in response to the frequency of the input voltage Vin.

Figure 2:
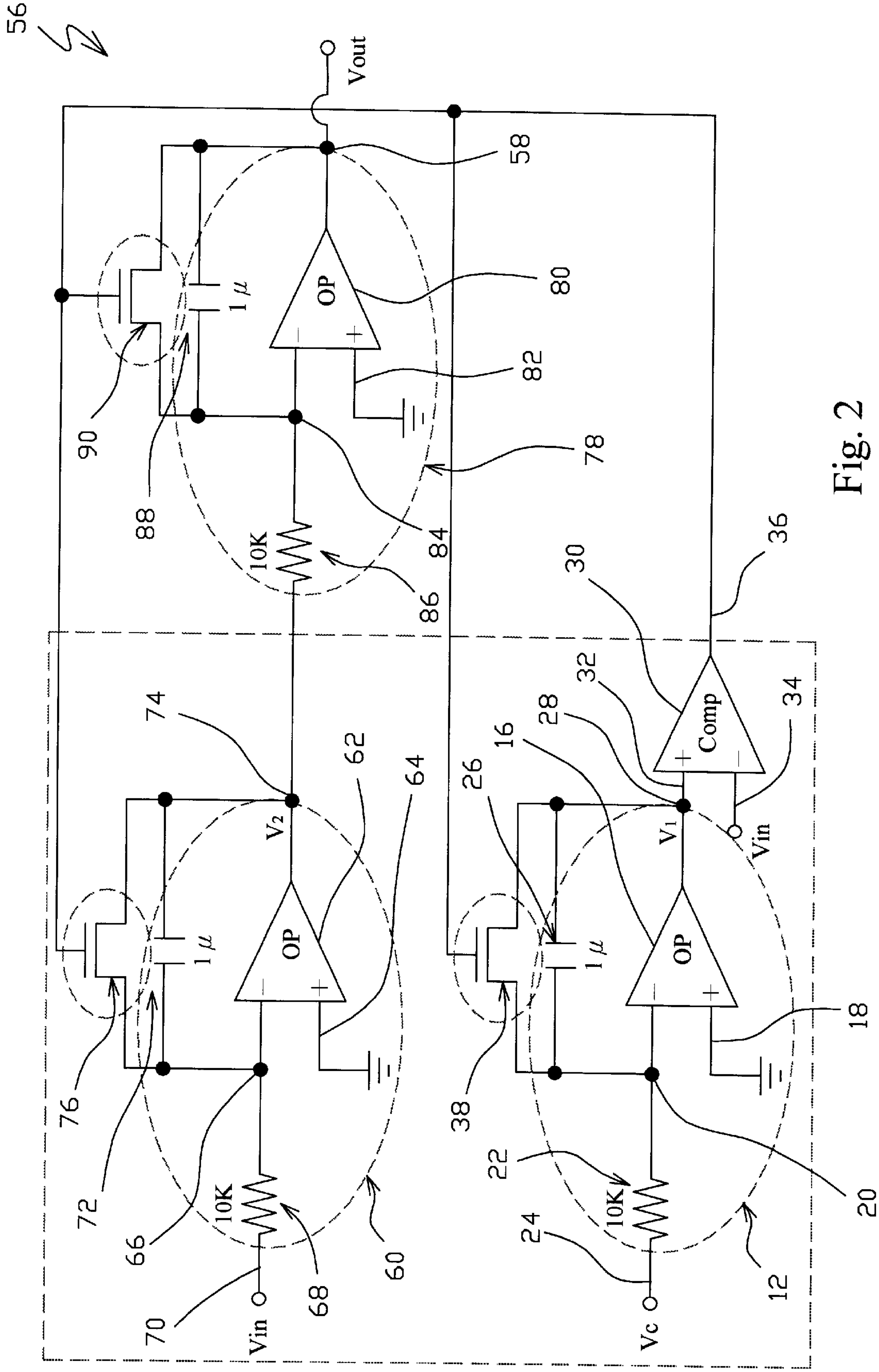
FIG. 2 is an embodiment 3-order circuit based on the principles of the square circuit shown in FIG. 1.

Based on the foregoing principles, a cube or 3-order circuit is showed in FIG. 2. The operational amplifier integral circuit 12, comparator 30 and switch 38 for the first unit of the 3-order circuit 56 are arranged in the same manner as the square circuit 10 of FIG. 1, while the second unit for the integration of the input voltage Vin includes two stages of subunits in cascade. In particular, the operational amplifier integral circuits 60 and 78 are cascaded between the input voltage Vin and the output Vout of the 3-order circuit 56. The input 70 of the operational amplifier integral circuit 60 is the voltage Vin, and whose output 74 is for the input of the subsequent operational amplifier integral circuit 78. The output 58 of the operational amplifier integral circuit 78 is the 3-order output Vout of the 3-order circuit 56. The operational amplifier integral circuit 60 includes an operational amplifier 62 whose non-negative input 64 is connected to ground and whose negative input 66 is connected with a resistor 68, and the other terminal 70 of the resistor 68 serves as the input of the operational amplifier integral circuit 60 and is connected with the input voltage Vin. A capacitor 72 is connected between the negative input 66 and output 74 of the operational amplifier 62, and the output 74 is further connected to the input of the next stage, i.e., the operational amplifier integral circuit 78. A MOS transistor 76 is connected to the capacitor 72 in parallel and is controlled by the output 36 of the comparator 30 to discharge the capacitor 72. The rear stage operational amplifier integral circuit 78 includes an operational amplifier 80 whose non-negative input 82 is connected to ground and whose negative input 84 is connected with the output 74 of the front stage operational amplifier integral circuit 60 through a resistor 86 to receive the output $V_2$ from the operational amplifier integral circuit 60. The output 58 of the operational amplifier 80 is for the output Vout of the 3-order circuit 56. A capacitor 88 is connected between the negative input 84 and the output 58 of the operational amplifier 80, and a MOS transistor 90 is connected to the capacitor 88 in parallel and is controlled by the output 36 of the comparator 30 to discharge the capacitor 88.

In the 3-order circuit 56, similar to the square circuit 10 of FIG. 1, before the output $V_1$ of the operational amplifier integral circuit 12 produced by the integration from the voltage Vc reaches to the voltage Vin, the operational amplifier integral circuit 60 is continuously integrated by the voltage Vin and its output 74 has an output voltage:

$$V_2 = -\frac{1}{RC}\int_0^t V_{in}dt = -\frac{1}{RC}V_{in}t, \quad \text{[EQ-5]}$$

where R is resistance of the resistor 68, and C is capacitance of the capacitor 72. However, the 3-order circuit 56 further includes the operational amplifier integral circuit 78 to integrate the output voltage $V_2$ of the operational amplifier integral circuit 60, and thus the 3-order circuit 56 has an output:

$$V_{OUT} = -\frac{1}{RC}\int_0^t V_2 dt, \quad \text{[EQ-6]}$$

where R is resistance of the resistor 86, and C is capacitance of the capacitor 88. By substituting EQ-5 to EQ-6, it is obtained:

$$V_{OUT} = -\frac{1}{RC}\int_0^t \left(-\frac{1}{RC}V_{in}t\right)dt = \frac{1}{2}\left(\frac{1}{RC}\right)^2 V_{in}t^2, \quad \text{[EQ-7]}$$

and further by substituting EQ-3 to EQ-7, it becomes:

$$V_{OUT} = \frac{1}{2}\left(\frac{1}{RC}\right)^2 V_{in}(RCV_{in})^2 = \frac{1}{2}V_{in}^3. \quad \text{[EQ-8]}$$

As a result, the output voltage Vout of the 3-order circuit 56 has a magnitude proportional to the cube of the input voltage Vin. In the foregoing derivation procedure, the resistors 22, 68, 86 and the capacitors 26, 72, 86 of the operational amplifier integral circuits 12, 60, 78 are assumed to be equal. However, for various applications, the desired proportional constant in EQ-8 can be obtained by adjustment of the resistors and capacitors in the circuit with the maintained cube relationship between the output voltage Vout and input voltage Vin.

By cascaded with more stages of operational amplifier integral circuits for the second unit in the foregoing embodiment circuit, any higher order circuit can be obtained, in which the stage number of the cascaded operational amplifier integral circuits is one less than the order. The high order operation circuit implemented in this manner will easily meet the multiple order function for mathematics operations. However, if the stages of the cascaded operational amplifier integral circuits for the second unit becomes much more, the time delay will be accumulated to be long.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A switching mode N-order circuit, where N is an integer larger than or equal to two, comprising:

a first unit including:

an operational amplifier integral circuit for integrating a first voltage to produce an output of the first unit; and a switch for being controlled to discharge the operational amplifier integral circuit of the first unit;

a comparator for comparing the output of the first unit with a second voltage to produce a control signal on an output of the comparator to control the switch of the first unit; and a second unit having one or more stages of subunits in cascade, each subunit including:

an operational amplifier integral circuit for integrating its input voltage to produce its output; and a switch connected with the output of the comparator for being controlled to discharge the operational amplifier integral circuit of the respective subunit;

wherein the input voltage of the first stage of subunit is connected with the second voltage and the output of the last stage of subunit is connected to an output of the N-order circuit, such that the second unit integrates the second voltage stage by stage by the subunits.

2. The N-order circuit of claim 1, wherein the operational amplifier integral circuit of the first unit comprises:

an operational amplifier having a first input, a second input connected with a reference voltage, and an output as the output of the operational amplifier integral circuit;

a capacitor connected between the first input and the output of the operational amplifier; and a resistor connected between the first input of the operational amplifier and the first voltage.

3. The N-order circuit of claim 1, wherein each operational amplifier integral circuit of the second unit comprises:

an operational amplifier having a first input, a second input connected with a reference voltage, and an output as the output of the operational amplifier integral circuit;

a capacitor connected between the first input and the output of the operational amplifier; and a resistor connected between the first input of the operational amplifier and the input voltage of the operational amplifier integral circuit.

4. The N-order circuit of claim 1, wherein each of the switches includes a MOS transistor.

5. The N-order circuit of claim 1, wherein the first voltage is a constant voltage.

6. The N-order circuit of claim 1, wherein the first voltage is a negative voltage.

7. The N-order circuit of claim 1, wherein the first voltage is −1 volt.

8. The N-order circuit of claim 1, wherein the second voltage is a DC voltage.

9. The N-order circuit of claim 1, wherein the second voltage is an AC voltage.

10. The N-order circuit of claim 1, wherein each of the operational amplifier integral circuits has a same integral speed.

11. A method for generating an output voltage having an amplitude proportional to N-order of an amplitude of a first voltage, where N is an integer larger than or equal to two, the method comprising the steps of:

integrating a second voltage for producing a third voltage;

integrating the first voltage by N−1 stages of integral circuits in cascade before an amplitude of the third voltage reaches the amplitude of the first voltage for producing a fourth voltage; and deriving the output voltage from the fourth voltage.

12. The method of claim 11, further comprising the step of comparing the amplitude of the third voltage with the amplitude of the first voltage to produce a control signal.

13. The method of claim 12, further comprising the step of terminating all integrations by the control signal.

14. The method of claim 11, further comprising the step of adjusting speed of all integrations.

* * * * *